June 24, 1930.  S. W. HYATT  1,765,763
FERRULE AND RETAINER FOR HEAD LAMPS
Filed Feb. 16, 1929
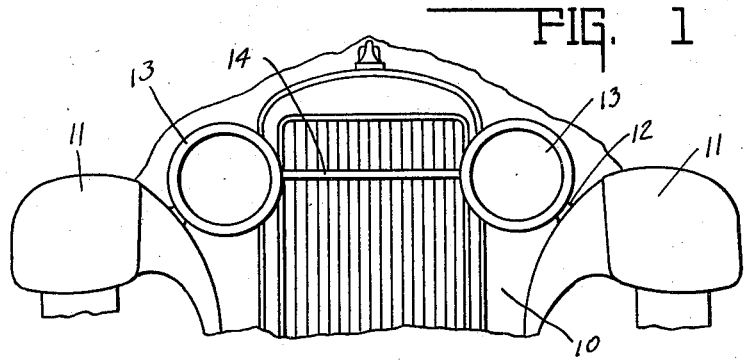
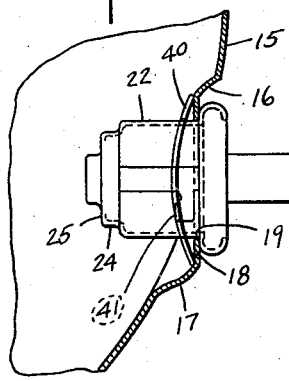 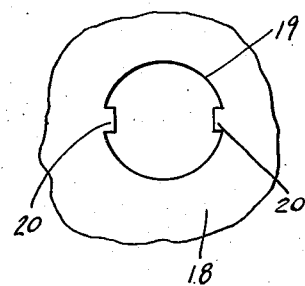 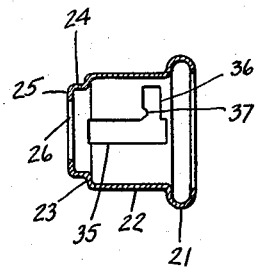
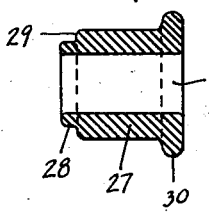 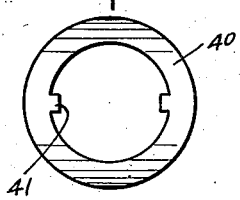 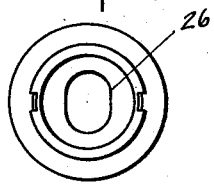
INVENTOR.
SAMUEL W. HYATT.
BY
ATTORNEYS.

Patented June 24, 1930

1,765,763

UNITED STATES PATENT OFFICE

SAMUEL W. HYATT, OF CONNERSVILLE, INDIANA, ASSIGNOR TO INDIANA LAMP CORPORATION, OF CONNERSVILLE, INDIANA, A CORPORATION

FERRULE AND RETAINER FOR HEAD LAMPS

Application filed February 16, 1929. Serial No. 340,514.

This invention relates to a fixed position support or anchorage construction.

The chief object of this invention is to provide a readily mounted, detachable, substantially fixed mounting arrangement for a supporting or supported member, and herein the same is shown adapted for headlamp tie bar use.

The chief feature of the invention consists in positioning upon a supporting member, such as a headlamp casing, and in an aperture thereof, a supporting ferrule and associating therewith a locking spring, the ferrule extending through the aperture and bearing upon one wall thereof, and the spring bearing upon the opposite wall.

The full nature of the invention will be more fully understood from the accompanying drawings and the following description and claims:

In the drawings Fig. 1 is a front view of a conventional automobile provided with a pair of independently mounted headlamps and a tie bar connecting the same. Fig. 2 is an enlarged transverse sectional view through one of the headlamps and illustrates the invention associated therewith and supporting tie bar construction. Fig. 3 is an elevational view of the aperture in the headlamp casing. Fig. 4 is a longitudinal sectional view through the ferrule. Fig. 5 is a longitudinal central section through the bushing. Fig. 6 is a front view of the locking spring. Fig. 7 is a rear view of the ferrule and bushing.

In the drawings 10 indicates an automobile including the fenders 11 from which extend brackets 12 each supporting a headlamp 13, each connected by a tie bar 14 to prevent lateral play therebetween and reduce vibration to a minimum. This tie bar arrangement is old in the art but the casing mounting thereof is not.

The headlamp 13 includes a casing 15 which is arranged as at 16 and 17 to form a circular flat plate portion 18 which is apertured in substantially circular form as at 19, except that there is provided a pair of diametrically positioned inwardly extending tongues 20. A ferrule is telescopically mounted in said aperture and said ferrule includes a semi-circular cross section annular bead portion 21 and a rearwardly extending tubular portion 22 connected by the annular reducing and shoulder forming flange portion 23 to another tubular extension 24 of reduced diameter. The end 25 of the ferrule opposite from the bead is partially closed and includes the elliptical opening 26, see Fig. 7.

A bushing of rubber or like material includes a cylindrical body 27 reduced as at 28 to form a shoulder 29. The body also includes an annular projecting bead or flange portion 30. Extending through the bushing is an elliptical bore or opening 31 which is adapted to register with the opening 26 in the ferrule. Relative longitudinal movement between the bushing and ferrule when the former is mounted therein is prevented by the flange 30 seating in the annular groove forming portion 21. The rod 14 has a cross section substantially that of the bore 31 and the opening 26. The rod extends through the same and may project therefrom, see Fig. 2.

The locking spring 40 is substantially annular and includes a pair of inwardly directed tongues 41. The spring is preferably curved in edge elevation, see Fig. 2.

The mount for the tie bar 14 is mounted as follows: The bushing is mounted in the ferrule and both are passed through the aperture 19 of the casing until the flange portion 21 engages one face of the plate 18. This movement is permitted by the tongues 20 of the casing being slidably receivable by an elongated slot 35 in the tubular portion 22 of the ferrule and said slot extends substantially the full length of said tubular portion. A pair of said slots is provided and the same are positioned diametrically opposite each other. The spring 40 is then telescoped upon the ferrule upon the opposite side of the casing. The tongues 41 of the spring are also receivable by the elongated slots 35. However, to maintain said spring in holding and locking relation each slot 35 includes a lateral extension 36 and the throat thereof is closed by a projection 37. The same constitutes an L-shaped extension. This L-shaped extension of the slot 35 is positioned relatively close to the bead or enlargement 21 upon the ferrule. The result is a bayonet slot type lock for the spring whereby the entire mount is mounted upon the casing in predetermined relation.

The invention claimed is:

1. The combination with a pair of headlamps and a tie bar therebetween, of a detachable anchorage between each lamp and the tie bar comprising a supporting plate portion of the lamp having a circular aperture therein, a cylindrical ferrule receivable by said aperture and including a plate engaging flange, said ferrule and plate having a tongue and slot connection preventing relative rotation therebetween, and a circularly apertured and curved ferrule encircling spring having a complementary portion for tongue and slot connection with said ferrule and with the first mentioned tongue and slot connecting portion thereof, said spring being directed toward the opposite face of the flange engaged plate portion for clampingly retaining the ferrule thereon.

2. A detachable cushion anchorage for a support member comprising a supporting plate having a circular aperture therein, a cylindrical ferrule receivable by said aperture and including a plate engaging flange, said ferrule and plate having a tongue and slot connection preventing relative rotation therebetween, a circularly apertured and curved ferrule encircling spring having a complementary portion for tongue and slot connection with said ferrule and with the first mentioned tongue and slot connecting portion thereof, said spring being directed toward the opposite face of the flange engaged plate for clampingly retaining the ferrule thereon, and a cushion bushing positioned in said ferrule for cushioning the support member and ferrule connection.

3. A detachable cushion anchorage for a support member comprising a supporting plate having a circular aperture therein, a cylindrical ferrule receivable by said aperture and including a plate engaging flange, said ferrule and plate having a tongue and slot connection preventing relative rotation therebetween, a circularly apertured and curved ferrule encircling spring having a complementary portion for tongue and slot connection with said ferrule and with the first mentioned tongue and slot connecting portion thereof, said spring being directed toward the opposite face of the flange engaged plate for clampingly retaining the ferrule thereon, and a cushion bushing positioned in said ferrule for cushioning the support member and ferrule connection, said bushing and said ferrule having complementary portions for locking the former within the latter.

4. In combination a supporting plate having a circular aperture therein, and a plurality of tongues directed inwardly and in spaced relation with each other, a cylindrical ferrule receivable by said aperture and including a plate engaging flange, said ferrule having a similar number of elongated slots therein and arranged in spaced relation for plate tongue reception and preventing relative rotation between the plate and ferrule, and a circularly apertured and curved ferrule encircling spring telescopically mounted upon said ferrule, said spring including a similar number of inwardly directed tongues arranged in spaced relation and each receivable by one of the ferrule slots, each ferrule slot including a lateral spring tongue seating extension whereby said spring is locked to said ferrule for clampingly mounting said ferrule upon the plate.

5. In combination a supporting plate having a circular aperture therein, a plurality of tongues directed inwardly and in spaced relation with each other, a cylindrical ferrule receivable by said aperture and including a plate engaging flange, said ferrule having a similar number of elongated slots therein and arranged in spaced relation for plate tongue reception and preventing relative rotation between the plate and ferrule, a circularly apertured and curved ferrule encircling spring telescopically mounted upon said ferrule, said spring including a similar number of inwardly directed tongues arranged in spaced relation and each receivable by one of the ferrule slots, each ferrule slot including a lateral spring tongue seating extension whereby said spring is locked to said ferrule for clampingly mounting said ferrule upon the plate, a bushing mounted within said ferrule, and complementary means upon said ferrule and bushing for lockingly retaining the bushing in the ferrule.

6. In combination a supporting plate having a circular aperture therein and a pair of oppositely and inwardly directed tongues, a cylindrical ferrule receivable by said aperture and including a plate engaging flange, said ferrule having a pair of parallel oppositely positioned longitudinally directed slots each of which terminates adjacent the flange portion for receiving said plate tongues and preventing relative rotation between the plate and ferrule, and a circularly apertured and curved ferrule encircling spring telescopically mounted upon said ferrule, said spring having a pair of oppositely and inwardly directed tongues receivable by said longitudinally directed ferrule slots, said ferrule having bayonet forming lateral slot extensions adjacent the flange end thereof for receiving spring tongues and locking the spring, ferrule and plate together.

7. A device as defined by claim 1, characterized by the detachable connection being of the friction cushion anti-rattling type and including the addition of a bar receiving cushion bushing, receivable by the ferrule and associated therewith to resist longitudinal displacement.

In witness whereof, I have hereunto affixed my signature.

SAMUEL W. HYATT.